April 1, 1941.  R. PATERAS PESCARA  2,237,082
POWER PLANT
Filed Nov. 18, 1938
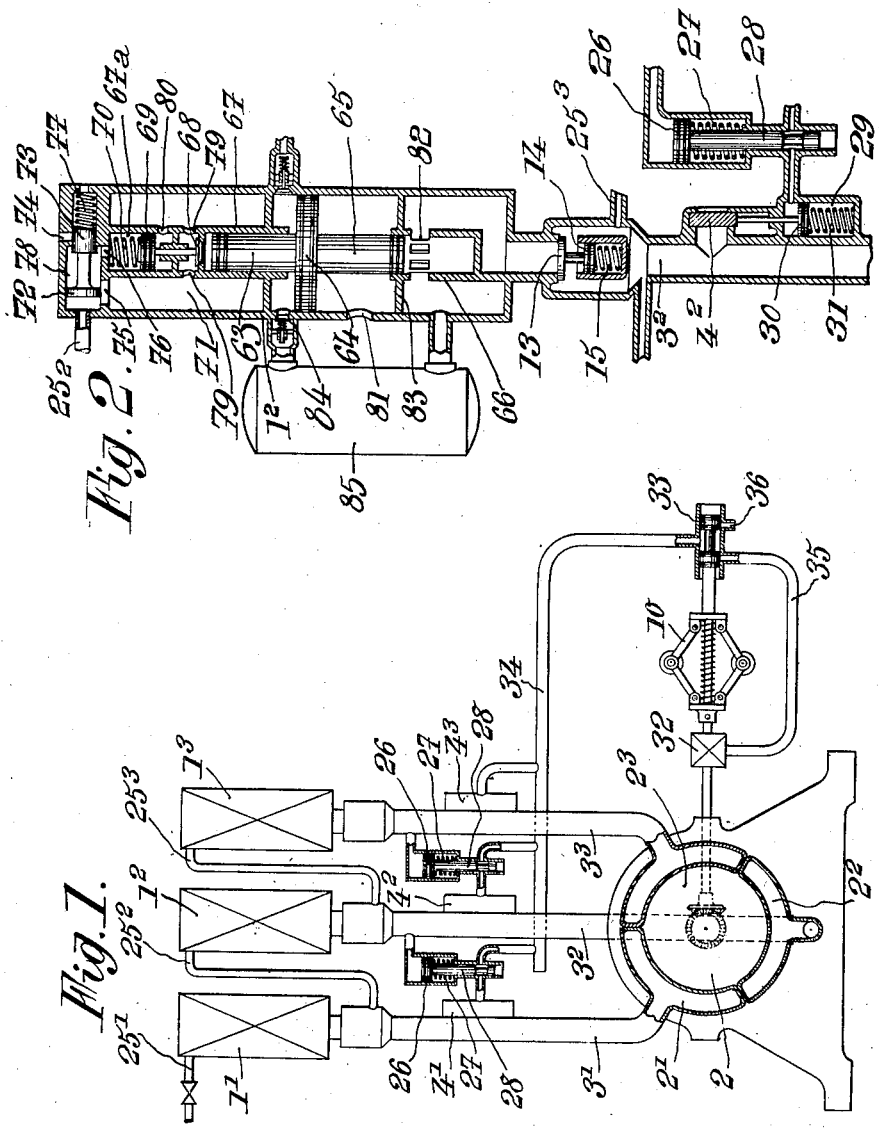
Inventor:
Raul Pateras Pescara,
Bailey & Carson
Attorneys Patented Apr. 1, 1941

2,237,082

UNITED STATES PATENT OFFICE 2,237,082

POWER PLANT

Raul Pateras Pescara, Paris, France

Application November 18, 1938, Serial No. 241,273
In France October 15, 1934

6 Claims. (Cl. 60—11)

The present application is a continuation in part of my application Ser. No. 44,982, filed Oct. 14, 1935, Patent No. 2,152,972 of April 4, 1939.

My invention relates to systems including several motor-compressors, and in particular motor-compressors of the free piston type, and a receiving machine common to these motor-compressors.

The object of the present invention is to provide a system of this type which is better adapted to meet the requirements of practice.

According to the essential feature of the present invention, in a system of the type above described, I provide means for bringing the motor-compressors into and out of action individually, according to the needs, and preferably in an automatic manner as a function of the variations of the load of the receiving machine.

Other features of the present invention will result from the following detailed description of a specific embodiment thereof.

A preferred embodiment of the present invention will be hereinafter described, with reference to the accompanying drawing, given merely by way of example, and in which:

Fig. 1 is a diagrammatic elevational view, partly in section, showing a system according to the invention including three motor compressors adapted to be associated with a single turbine, and the means for controlling said compressors;

Fig. 2 is a detail view showing the means for starting or stopping a compressor.

As above stated, the object of the invention is to provide a plant including at least two compressed gas generators adapted to feed compressed gas to a receiving machine, for instance of the turbine type.

Concerning the compressed gas generators, they are advantageously of the auto-generator type, having freely movable pistons.

In the example shown by the drawing, there are three generators of this type, to wit, $1^1$, $1^2$ and $1^3$, which feed fluid under pressure, through conduits $3^1$, $3^2$, and $3^3$ to the inlet chambers $2^1$, $2^2$ and $2^3$ of a turbine 2.

In order to obtain a good working of the compressors, I may provide, for instance between each compressor 1 and the corresponding conduit 3, a valve such as 13 (Fig. 2) automatically operated by a piston 14 subjected to the action of the pressure existing in said conduit 3 and to the action of an antagonistic spring 15, in such manner that, if the pressure is zero or insufficient in said conduit 3, valve 13 prevents, through its being closed, the reduction of the delivery pressure of the corresponding compressor 1.

Discharge valves $4^1$, $4^2$ and $4^3$ are provided respectively on the corresponding conduits $3^1$, $3^2$, and $3^3$, so as to allow a variable part of the compressed gas to escape into the atmosphere, this variable discharge being adjustable, preferably, according to the load of the turbine.

According to the essential feature of the present invention, in order to reduce to a minimum the amount of compressed fluid which is lost into the atmosphere, I provide means for stopping or starting one or several compressors individually, so as to permit of adjusting the power supplied in accordance with considerable variations of the load of the turbine.

In the embodiment illustrated by the drawing, each compressor is automatically controlled in response to the pressure existing in the discharge conduit of a preceding compressor, said pressure being transmitted through conduits such as $25^2$ and $25^3$, while the control conduit $25^1$ of generator $1^1$ is in communication with a source of compressed air located on the outside. Each of the compressors is started when the pressure in the corresponding control conduit reaches a predetermined value. Inversely, each of these compressors is automatically stopped when the pressure transmitted through the corresponding control conduit drops below a predetermined value.

Fig. 2 shows one of the compressors, to wit, compressor $1^2$, in cross section. For the sake of simplicity of showing, this compressor includes only one piston group.

This piston group consists of three piston elements 63, 64, and 65. Part 65 forms the motor piston which works in a motor cylinder 66. Part 64 forms the compressor piston which works in the compressor cylinder formed by the casing thereof and dividing walls such as 83. The space below piston part 64 communicates with the atmosphere through opening 81. Part 63 forms the piston for the compensating air cushion within the compensating cylinder 67.

Air compressed in a space above piston part 64 passes through check valve 84 and reservoir 85 into the space surrounding motor cylinder 66 and thence to the outlet of the compressor. Cylinder 66 communicates with this space by openings 82.

The starting of the compressor is produced by injecting starting air under pressure into the compensating cylinder, which is provided, for this purpose, with a starting valve 68 rigid with a piston 69 movable in an extension of cylinder 67. A spring 70 acts on said piston 69 and constantly tends to maintain valve 68 in the closed position.

In the upper part of the compressor casing, there is a slide-valve including two pistons 72 and 73 movable in a cylindrical chamber 78. The portion of said chamber ahead of piston 72 communicates directly with conduit $25^2$ (directly connected with the discharge conduit $3^1$ of the preceding compressor $1^1$).

Slide-valve 72—73 is subjected to the opposing action of spring 77.

Cylindrical chamber 78 communicates with an annular chamber 71 (surrounding cylinder 67) through a hole 75 along which piston 72 is movable.

Chamber 78 further communicates through a hole 76 with the cylindrical extension $67^a$ in which piston 69 is movable, above said piston.

Holes 79 and 80 connect the space between piston 69 and valve 68 with annular chamber 71.

Finally, cylindrical chamber 78 is provided with a hole 74 opening into the atmosphere and adapted to be uncovered by piston 73 when the latter is pushed into extreme position toward the right against the action of spring 77.

I will first describe the operation of this starting device.

When the pressure in conduit $25^2$ (that is to say in conduit $3^1$) is below a given value, slide valve 72—73 is in the position shown by the drawing. This pressure is transmitted through hole 75 to annular chamber 71, and also to the other side of piston 72 and, through hole 76, to the upper face of piston 69. Therefore, as both sides of piston 69 are subjected to the same pressure these actions balance each other, and valve 68 remains closed under the effect of the pressure in question acting upon the upper face of said valve and of spring 70.

When the pressure in conduit $25^2$ exceeds a given value because of an increased load on the driven machine, slide valve 72—73 is pushed toward the right, the space between pistons 72 and 73 ceases to be connected with conduit $25^2$ and, on the contrary, through hole 74, it is connected with the atmosphere. Therefore through hole 76, the upper face of piston 69 communicates with the atmosphere. On the other hand, the pressure acting upon the under face of piston 69 exerts upon said piston a force greater than that exerted by said pressure on the upper face of valve 68, since the area of piston 69 is considerably greater than that of valve 68. And the difference of these forces is greater than the action of spring 70, so that said valve 68 is lifted from its seat. The compressed gas then enters cylinder 67 and starts the compressor.

It will be noted that when the pressure in conduit $25^2$ drops below the value above considered, because of the decrease in the load on the driven machine the device works in the reverse order and closes back valve 68, thus stopping the compressor.

Now, if the load of the turbine drops, only the discharge valve of the generator which is the last to be started can be operated, the other discharge valves $4^1$ and $4^2$ being then locked, in their closed positions, by a system, preferably of the type shown by Fig. 1. This system includes, for each of the valves $4^1$ and $4^2$, a piston 26 subjected, on one of its faces, to the pressure existing in the discharge conduit, $3^2$ or $3^3$, of the next generator $1^2$ or $1^3$, and, on its other face, to the action of a spring 27. Each piston 26 drives a slide valve 28 which according to its position, opens or closes an inlet for a driving fluid, such for instance as oil under pressure, said inlet communicating with a cylinder 29, in which the action of said fluid on a piston 30, balanced by the action of a spring 31, serves to operate the corresponding valve $4^1$ or $4^2$. The distribution of oil under pressure fed by a pump 32, driven for instance by the turbine, can be adjusted by means of a slide-valve which may be operated manually but which, advantageously, is coupled with the governor 10 of the turbine. For instance, this distributing member consists of a slide valve such as shown at 33. According to the position occupied by said slide valve 33, either the feed conduit 34 for cylinders 29 is connected either with the discharge conduit 35 of the pump, or with the exhaust conduit 36, or communication between these conduits 34 and 35 is wholly stopped.

If generators $1^1$, $1^2$ and $1^3$ are working and the load of the turbine drops, the action of governor 10 causes conduits 34 and 35 to be connected together and oil under pressure is fed to the cylinder 29 corresponding to valve $4^3$, which is opened by the corresponding piston 30. As a consequence, the pressure drops in conduit $3^3$ and when valve $4^3$ is fully opened, the pressure in said conduit is insufficient for keeping the slide valve 28 of valve $4^2$ in closed position. Due to the opening of this slide valve, oil under pressure is fed to the corresponding cylinder 29, which ensures the opening of valve $4^2$. It follows that the pressure in conduit $3^2$ decreases and that, in view of the transmission of said pressure through conduit $25^3$, compressor $1^3$ is caused to stop. Said generator of compressed gas can be brought back into operation only when valve $4^2$ is fully closed, which takes place when the load on the turbine increases and slide valve 33, driven by governor 10, closes conduit 35 and connects conduit 34 with the emptying conduit 36. It follows that the pressure ceases to act in cylinder 29, the piston of which controls valve $4^2$, said piston being brought back into the closed position by the corresponding spring 31.

In a general manner, while I have, in the above description, disclosed what I deem to be practical and efficient embodiments of the present invention, it should be well understood that I do not wish to be limited thereto as there might be changes made in the arrangement, disposition and form of the parts as comprehended within the scope of the accompanying claims.

What I claim is:

1. In a power plant comprising a plurality of free piston motor compressors, a receiving machine, and means to conduct fluid under pressure from each of said motor compressors to said machine, each of said motor compressors including a fluid pressure starting device, means controlled automatically by variations in the load on the machine to operate various of said starting devices as the load increases to increase the number of motor compressors in operation, and to stop various of said motor compressors as the load decreases to decrease the number in operation.

2. In a power plant comprising a plurality of free piston motor compressors, a receiving machine, and means to conduct fluid under pressure from each of said motor compressors to said machine, each of said motor compressors including a fluid pressure starting device, means controlled automatically by variations in the delivery pressure of the compressors to operate various of said starting devices as the load increases to increase the number of motor compressors in operation, and to stop various of said motor compressors as the load decreases to decrease the number in operation.

3. In a power plant comprising a plurality of free piston motor compressors, a turbine, and means to conduct fluid under pressure from each of said motor compressors to said turbine, each of said motor compressors including a fluid pressure starting device, means controlled automatically by variations in the delivery pressure of the compressors to operate various of said starting devices as the load increases to increase the number of motor compressors in operation, and to stop various of said motor compressors as the load decreases to decrease the number in operation.

4. In a power plant comprising a plurality of free piston motor compressors, a turbine, and means to conduct fluid under pressure from each of said motor compressors to said turbine, each of said motor compressors including fluid pressure starting apparatus, a governor connected to said turbine and driven thereby, and means operated by said governor in response to variations in the speed of the turbine to operate various of said starting devices as the load increases to increase the number of motor compressors in operation, and to stop various of said motor compressors as the load decreases to decrease the number in operation.

5. In a power plant comprising a plurality of free piston motor compressors, a turbine having a plurality of inlet chambers, and a plurality of delivery conduits for conducting fluid under pressure from said motor compressors to the respective inlet chambers of said turbine, each of said motor compressors including a fluid pressure starting device, means in each delivery conduit to discharge fluid therefrom, a governor connected to said turbine and driven thereby, means operated by said governor in response to variations in the speed of the turbine to operate said discharging means, and means controlled automatically by variations in the pressure in the delivery conduits to operate various of said starting devices as the load increases to increase the number of motor compressors in operation, and to stop various of said motor compressors as the load decreases to decrease the number in operation.

6. In a power plant comprising a plurality of free piston motor compressors, a receiving machine, and a plurality of delivery conduits for conducting fluid under pressure from each of said motor compressors to said machine, each of said motor compressors including a fluid pressure starting apparatus, means connecting the starting devices of at least some of the motor compressors to the delivery conduits of other motor compressors, whereby upon variations in the load on the machine to operate various of said starting devices as the load increases to increase the number of motor compressors in operation, and to stop various of said motor compressors as the load decreases to decrease the number in operation.

RAUL PATERAS PESCARA.